Figure 2:
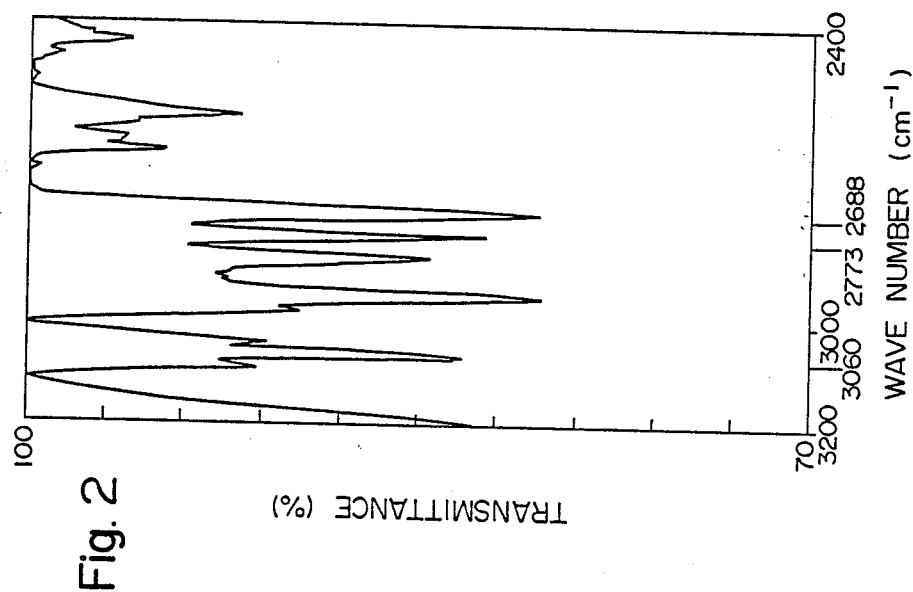

United States Patent [19]

Takei et al.

[11] Patent Number: 4,888,422
[45] Date of Patent: Dec. 19, 1989

[54] PROCESS FOR PRODUCING DIMETHYLAMINOMETHYL COPPER PHTHALOCYANINE AND/OR ITS DERIVATIVES

[75] Inventors: Toshio Takei, Hasaki; Toshio Tanaka, Omigawa, both of Japan

[73] Assignee: Dainippon Ink and Chemicals, Inc., Tokyo, Japan

[21] Appl. No.: 279,796

[22] Filed: Dec. 5, 1988

Related U.S. Application Data

[63] Continuation-in-part of Ser. No. 126,350, Nov. 30, 1987, Pat. No. 4,810,297, which is a continuation-in-part of Ser. No. 936,765, Dec. 2, 1986, abandoned.

[30] Foreign Application Priority Data

Dec. 10, 1985 [JP] Japan .................................. 60-275974

[51] Int. Cl.$^4$ .............................................. C09B 67/50
[52] U.S. Cl. ...................................... 540/135; 106/411
[58] Field of Search ................................ 106/410–413; 540/136, 135

[56] References Cited

U.S. PATENT DOCUMENTS 4,810,297 5/1989 Takei et al. ........................ 106/411

FOREIGN PATENT DOCUMENTS 724212 2/1955 United Kingdom .

*Primary Examiner*—Theodore Morris
*Attorney, Agent, or Firm*—Sherman and Shalloway

[57] ABSTRACT

Dimethylaminomethyl copper phthalocyanine and/or its derivative represented by the general formula,

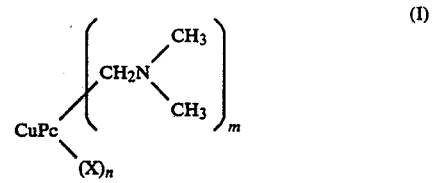

wherein CuPc represents a copper phthalocyanine residue, X represents a hydrogen atom, a halogen atom, the group —SO$_3$H or the group —CH$_2$OH, and m and n independently represent an integer of 1 to 4, and containing only small amounts of by-products is produced by a process comprising reacting aminomethyl copper phthalocyanine and/or its derivatives represented by the general formula

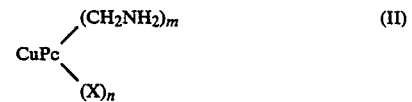

wherein CuPc, X, m and n are as defined above, with formic acid and a formaldehyde-generating substance at a temperature of 130° to 150° C. under a pressure of 3 to 10 kg/cm$^2$ (gauge).

5 Claims, 1 Drawing Sheet

PROCESS FOR PRODUCING DIMETHYLAMINOMETHYL COPPER PHTHALOCYANINE AND/OR ITS DERIVATIVES

This application is a continuation-in-part application Ser. No. 126,350, now U.S. Pat. No. 4,810,297 filed Nov. 30, 1987, which in turn is a continuation-in-part of application Ser. No. 936,765, filed Dec. 2, 1986, now abandoned.

This invention relates to a process for producing dimethylaminomethyl copper phthalocyanine and/or its derivative which contains only slight amounts of by-products and is useful for improving the suitability of use, particularly represented by aggregating properties and crystal properties, of phthalocyanine pigments in printing inks and paints. In the following description, particularly in Examples, the "dimethylaminomethyl copper phthalocyanine and/or its derivative which contains only slight amounts of by-products" is referred to as the "dimethylaminomethyl copper phthalocyanine mixture".

More specifically, this invention relates to a process for producing the dimethylaminomethyl copper phthalocyanine mixture, a pigment composition comprising a phthalocyanine pigment and the dimethylaminomethyl copper phthalocyanine mixture, and a paint containing the pigment composition.

Copper phthalocyanine pigments have been widely used in coloring materials and the like because of their superior shades and fastness characteristics, but have certain defects. For example, when they are used in printing inks and paints, they undergo crystal transfer from the alpha type to the beta type or crystal growth or show a high structural viscosity as a result of floculation of the pigment particles. In paint formulations containing these pigments in combination with other pigments, such problems as flooding or pigment sedimentation arise.

In order to remove such defects, it has been the previous practice to use dimethylaminomethyl copper phthalocyanine and/or its derivatives.

In the prior art, dimethylaminomethyl copper phthalocyanine is produced by various methods, among which are (1) a method comprising reacting copper phthalocyanine with bis-chloromethyl ether in the presence of aluminum chloride, and reacting the chloromethylated product with dimethylamine (U.S. Pat. No. 2,435,307), (2) a method comprising reacting copper phthalocyanine with paraformaldehyde in chlorosulfonic acid, and reacting the chloromethylated product with dimethylamine, and (3) a method comprising reacting aminomethyl copper phthalocyanine with formic acid and formaldehyde under atmospheric pressure at a temperature of up to about 100° C. to methylate the copper phthalocyanine (British Pat. No. 724,212).

The method (1) raises a problem in labor hygiene in that carcinogenic bis-chloromethyl ether must be directly used as a starting material. The method (2) also raises a similar problem because bis-chloromethyl ether is formed in the reaction system. The method (3) is very disadvantageous economically because it performs the reaction under atmospheric pressure at a temperature of not more than 100° C. and therefore requires a large amount of formic acid. The method (3) further has the defect that because monomethylaminomethyl copper phthalocyanine is included as a by-product in the final product, the use of the final product in combination with a copper phthalocyanine pigment will cause flooding or pigment sedimentation in a paint formulation.

It is a primary object of this invention to provide a process for producing dimethylaminomethyl copper phthalocyanine and/or its derivatives in which the formation of monomethylaminomethyl copper phthalocyanine and its derivatives is very much reduced, in order to solve these problems of the prior art.

A secondary object of this invention is to provide a pigment composition and a paint which can solve the aforesaid problems of the prior art.

According to this invention, these objects are achieved by a process for producing dimethylaminomethyl copper phthalocyanine and/or its derivative represented by the general formula

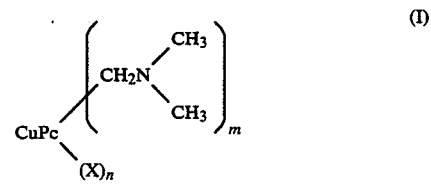

wherein CuPc represents a copper phthalocyanine residue, X represents a hydrogen atom, a halogen atom, the group —SO$_3$H or the group —CH$_2$OH, and and m and n independently represent an integer of 1 to 4, and containing only slight amounts of by-products, which comprises reacting aminomethyl copper phthalocyanine and/or its derivative represented by the general formula

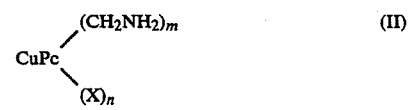

wherein CuPc, X, m and n are as defined above, with formic acid and a formaldehyde-generating substance at a temperature of 130° to 150° C. under a pressure of 3 to 10 kg/cm$^2$ (gauge); a pigment composition comprising the product of the above process and a phthalocyanine pigment; and a paint comprising the pigment composition and a vehicle.

Examples of the aminomethyl copper phthalocyanine and/or its derivatives represented by general formula (II) include mono(aminomethyl) copper phthalocyanine, di(aminomethyl) copper phthalocyanine, tri(aminomethyl) copper phthalocyanine, tetra(aminomethyl) copper phthalocyanine, aminomethyl copper phthalocyanines having a halogen atom, —SO$_3$H or —CH$_2$OH, and mixtures of these. The aminomethyl copper phthalocyanine and/or its derivative is used in the form of a powder or a wet cake in the process of this invention. The compounds of general formula (II) may be produced, for example, by the method described in British Pat. No. 717,137.

The amount of formic acid used in this invention is usually 1 to 20 moles per mole of the amino group of the aminomethyl copper phthalocyanine and/or its derivative represented by general formula (II). In view of convenience in the reaction and a neutralization treatment with alkalies, the amount of formic acid is preferably 6 to 8 moles per mole of the amino group of the compound of formula (II).

The formaldehyde-generating substance used in this invention is preferably formaldehyde, formalin and paraformaldehyde. It is preferably used as an aqueous solution. The amount of the formaldehyde-generating substance is usually 2 to 5 moles as formaldehyde per mole of the amino group of the compound of formula (II). In view of its door and lacrimatory property, its amount is preferably 2 to 3 moles per mole of the amino group of the compound of formula (II).

The process of this invention may be carried out at a temperature of 130° to 150° C. under a pressure of 3 to 10 kg/cm$^2$ (gauge). The pressure may be attained by feeding a pressurization gas into a closed reactor. Usually, however, the pressure of steam generated by heating the reactants in the closed reactor at a temperature higher than 100° C. and carbon dioxide gas formed by the reaction suffice as the reaction pressure. If desired, the gases may be removed.

According to the process of this invention, dimethylaminomethyl copper phthalocyanine and/or its derivative containing only slight amounts of by-products (i.e., the dimethylaminomethyl copper phthalocyanine mixture) can be obtained, for example, by feeding predetermined amounts of aminomethyl copper phthalocyanine and/or its derivative, formic acid and the formaldehyde-generating substance and optionally water into a reactor capable of being sealed up, elevating the temperature to 130° to 150° C. over the course of 0.5 to 5 hours with stirring and simultaneously applying pressure, and further maintaining the reactants at the attained temperature and pressure for 3 to 10 hours.

The process of this invention for producing the dimethylaminomethyl copper phthalocyanine mixture is much superior to the prior art because it does not require a carcinogenic substance that gives rise to a problem of labor hygiene and the amounts of by-products in the final product are small.

The dimethylaminomethyl copper phthalocyanine mixture so produced is added to a phthalocyanine pigment and used as a pigment composition. Its amount is usually 0.5 to 30 parts by weight, preferably 5 to 15 parts by weight, per 100 parts by weight of the phthalocyanine pigment. Examples of the phthalocyanine pigment are copper phthalocyanine, iron phthalocyanine, nickel phthalocyanine, cobalt phthalocyanine, and metal-free phthalocyanine. Usually, copper phthalocyanine is used.

A paste for paints containing the pigment composition in accordance with this invention has good fluidity and storage stability. Accordingly, paints containing the pigment composition of this invention, for example alkyd resin paints, acrylic resin paints, acrylic urethane resin paints, aminoalkyd resin paints and nitrocellulose lacquers, have the advantage that even when they are used in combination with other types of pigments such as titanium white, carbon black, red iron oxide and chrome yellow, flooding, sedimention, crystal transformation, crystal growth, etc. do not easily occur. Another advantage is that a gravure ink prepared by using the above pigment composition has excellent fluidity.

The following Examples, Comparative Examples and Test Examples illustrate the present invention in more detail. All percentages in these examples are by weight.

Figure 1:
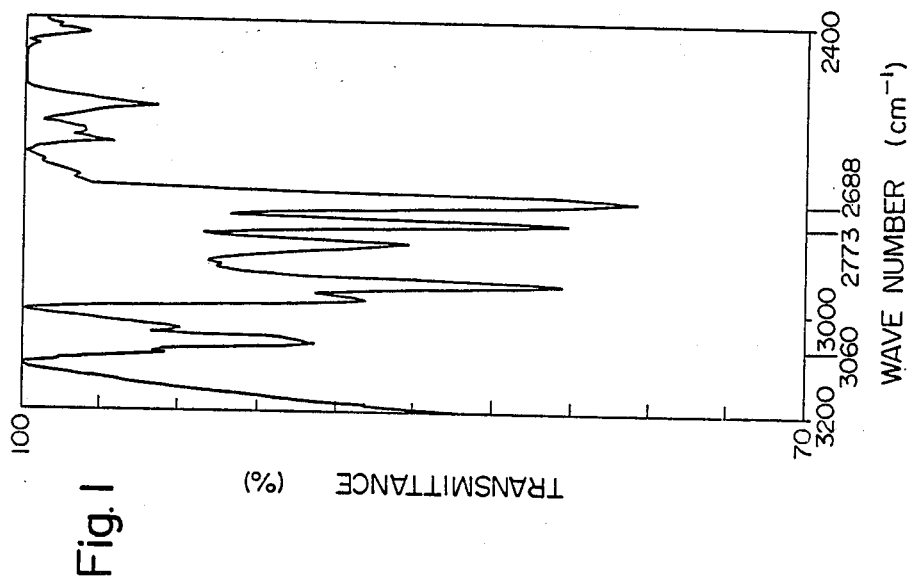

In the accompanying drawings,

FIG. 1 is an infrared absorption spectrum of the dimethylaminomethyl copper phthalocyanine obtained in Example 1, and FIG. 2 is an infrared absorption spectrum of the dimethylaminomethyl copper phthalocyanine obtained in Comparative Example 1.

EXAMPLE 1

A 10-liter enamelled vessel equipped with a stirrer and a thermometer was charged with 2,400 g of a wet cake of phthalimidomethyl copper phthalocyanine (600 g of a phthalimidomethyl copper phthalocyanine mixture having 1.4 phthalimidomethyl groups on an average) and 3,800 g of water. After these materials were fully dispersed, 860 g of a 20% aqueous solution of sodium hydroxide was added, and the mixture was reacted at 85° C. for 2 hours with stirring. Subsequently, 1,200 g of 20% hydrochloric acid was added, and the mixture was further maintained at 85° C. for 2 hours with stirring. After the reaction, 530 g of a 20% aqueous solution of sodium hydroxide was added to make the reaction mixture weakly alkaline. The reaction mixture was then filtered and washed with water to give 1440 g of a wet cake of aminomethyl copper phthalocyanine (432 g of an aminomethyl copper phthalocyanine mixture having 1.4 aminomethyl groups on an average).

A 1000 ml autoclave equipped with a stirrer and a thermometer was charged with 100 g of the resulting wet cake of aminomethyl copper phthalocyanine (30 g of aminomethyl copper phthalocyanine), 400 g of water, 27 g (7.6 moles per mole of the amino group) of an 88% aqueous solution of formic acid and 6 g (2.3 moles per mole of the amino group) of 80% paraformaldehyde. The temperature was raised to 140° C. over the course of 1 hour with stirring, and then the reaction materials were maitained at this temperature for 5 hours. The pressure in the autoclave increased and reached 3.5 to 4.0 kg/cm$^2$ (gauge) when the temperature rose to 140° C. Thereafter, the pressure reached 5.0 to 5.5 kg/cm$^2$ (gauge). After the reaction, the reaction mixture was cooled to room temperature, and the gases were removed. It was made weakly alkaline by adding 71 g of a 20% aqueous solution of sodium hydroxide, and thereafter filtered, washed with water, and dried at 70° to 80° C. to give 30 g of a dimethylaminomethyl copper phthalocyanine mixture having 1.4 dimethylaminomethyl groups on an average. The mixture contained only small amounts of by-products such as monomethylaminomethyl copper phthalocyanine.

EXAMPLE 2

A dimethylaminomethyl copper phthalocyanine mixture (27 g) was obtained by repeating Example 1 except that the reaction temperature in the autoclave was changed to 133° C. The pressure of the inside of the autoclave was 3 to 3.5 kg/cm$^2$ (gauge) when the temperature was elevated to 133° C., and reached 4.5 to 5.0 kg/cm$^2$ (gauge) thereafter. The resulting mixture contained only slight amounts of by-products such as monomethylaminomethyl copper phthalocyanine.

COMPARATIVE EXAMPLE 1

Instead of the 1000 ml autoclave used in Example 1, a 500 ml four-necked cylindrical flask equipped with a stirrer, a condenser and a thermometer was used. With stirring, the temperature was raised to 90° C. over the course of 30 minutes, and thereafter the reaction was carried out under atmospheric pressure for 5 hours.

Otherwise, the same procedure as in Example 1 was repeated to give 31 g of a dimethylaminomethyl copper phthalocyanine mixture. This mixture contained large amounts of aminomethyl copper phthalocyanine and monomethylaminomethyl copper phthalocyanine.

COMPARATIVE EXAMPLE 2

A dimethylaminomethyl copper phthalocyanine mixture (28 g) was obtained by repeating Comparative Example 1 except that the reaction temperature was changed to 98° C. This mixture contained aminomethyl copper phthalocyanine and monomethylaminomethyl copper phthalocyanine.

COMPARATIVE EXAMPLE 3

The same four-necked cylindrical flask as in Comparative Example 1 was changed with 100 g of a wet cake of aminomethyl copper phthalocyanine (30 g of an aminomethyl copper phthalocyanine mixture having 1.4 aminomethyl groups on an average) obtained in the same way as in Example 1, 300 g (84.2 moles per mole of the amino group) of an 88% aqueous solution of formic acid and 32.4 g (5.9 moles per mole of the amino group) of 37% formalin. With stirring, the materials were reacted at 85° C. under atmospheric pressure for 5 hours. After the reaction, 100 g of water was added, and the reaction mixture was cooled. The mixture was then poured into 10 liters of a 2% aqueous solution of sodium hydroxide and made weakly alkaline. It was filtered, washed, and dried at 70° to 80° C. to give 30 g of a dimethylaminomethyl copper phthalocyanine mixture. The mixture contained large amounts of aminomethyl copper phthalocyanine and monomethylaminomethyl copper phthalocyanine.

EXAMPLE 3

By operating in the same way as in Example 1 except that a tetrachlorinated phthalimidomethyl copper phthalocyanine mixture having 0.5 phthalimidomethyl group on an average was used instead of the phthalimidomethyl copper phthalocyanine mixture having 1.4 phthalimidomethyl groups on an average, a wet cake of tetrachlorinated aminomethyl copper phthalocyanine having 0.5 aminomethyl group on an average was prepared. Then, in the same way as in Example 1, 28 g of a tetrachlorinated dimethylaminomethyl copper phthalocyanine mixture having 0.5 dimethylaminomethyl group on an average was obtained from the wet cake. The mixture contained only small amounts of by-products.

COMPARATIVE EXAMPLE 4

A tetrachlorinated dimethylaminomethyl copper phthalocyanine mixture was obtained in the same way as in Comparative Example 1 except that a tetrachlorinated phthalimidomethyl copper phthalocyanine mixture having 0.5 phthalimidomethyl group on an average was used instead of the phthalimidomethyl copper phthalocyanine mixture having 1.4 phthalimidomethyl groups on an average. The resulting mixture contained large amounts of tetrachlorinated aminomethyl copper phthalocyanine and tetrachlorinated monomethylaminomethyl copper phthalocyanine.

EXAMPLE 4

By operating in the same way as in Example 1 except that a sulfonated phthalimidomethyl copper phthalocyanine mixture having 1.2 phthalimido groups on an average was used instead of the phthalimidomethyl copper phthalocyanine mixture having 1.4 phthalimidomethyl groups on an average, a wet cake of sulfonated aminomethyl copper phthalocyanine was prepared. Thereafter, in the same way as in Example 1, 31 g of a sulfonated dimethylaminomethyl copper phthalocyanine mixture having 1.2 dimethylaminomethyl groups on an average was obtained from the wet cake. The mixture contained only small amounts of by-products.

EXAMPLE 5

By operating in the same way as in Example 1 except that a methylolated phthalimidomethyl copper phthalocyanine mixture having 1.2 phthalimido groups on an average was used instead of the phthalimidomethyl copper phthalocyanine mixture having 1.4 phthalimidomethyl groups on an average, a wet cake of methylolated aminomethyl copper phthalocyanine was prepared. Thereafter, in the same way as in Example 1, 29 g of a methylolated dimethylaminomethyl copper phthalocyanine mixture having 1.2 dimethylaminomethyl groups on an average was obtained from the wet cake. The mixture contained only small amounts of by-products.

TEST EXAMPLE 1

In each run, copper phthalocyanine pigment (37.8 g), 4.2 g of each of the dimethylaminomethyl copper phthalocyanine mixtures or the dimethylamminomethyl copper phthalocyanine derivative mixtures obtained in Examples 1 to 5 and Comparative Examples 1 to 4, 64 g of a 7:3 mixed solvent of toluene and butyl acetate, and 84 g of a resin (Acrydic A-801-P, an acrylic polyol produced by Dainippon Ink and Chemicals, Inc.) were shaken and dispersed together with 300 g of glass beads by a paint conditioner for 60 minutes. Then, 230 g of the resin was further added, and the materials were further dispersed for 5 minutes to prepare a 10% full shade paste. Separately, 126 g of titanium white, 84 g of the resin and 32 g of the mixed solvent were shaken and dispersed together with 300 g of glass beads for 60 minutes by a paint conditioner. Then, 178 g of the resin as further added, and the materials were dispersed further for 5 minutes to prepare a 30% white paste. Thereafter, 7.5 g of the full shade paste, 25 g of the white paste and 2.4 g of a curing agent (Sumidur N-75, a polyisocyanate produced by Sumitomo Bayer co., Ltd.) were mixed to produce a tinting shade enamel.

The tinting shade enamel was subjected to a rubbing test and a color strength test. It was found that enamels prepared by using the samples obtained in Examples 1 to 5 hardly showed floating, whereas in enamels prepared from the samples obtained in Comparative Examples 1 to 4, floating of titanium white occurred, showing the flocculation of the copper phthalocyanine pigments. The color strengths of the enamels prepared from the samples obtained in Comparative Examples were much inferior to those of the enamels prepared from the samples obtained in Examples, and the comparative enamels had a reduced value. The results are summarized in Table 1.

TABLE 1

| Ex. or CEx. | Rubbing test (%) (*1) | Color strength (%) (*2) |
|---|---|---|
| Ex. 1 | 102 | 100 |

TABLE 1-continued

| Ex. or CEx. | Rubbing test (%) (*1) | Color strength (%) (*2) |
| --- | --- | --- |
| Ex. 2 | 101 | 100 |
| CEx. 1 | 87 | 81 |
| CEx. 2 | 92 | 91 |
| CEx. 3 | 90 | 86 |
| Ex. 3 | 101 | 99 |
| CEx. 4 | 92 | 90 |
| Ex. 4 | 97 | 96 |
| Ex. 5 | 99 | 99 |

Ex. = Example; CEx. = Comparative Example
(*1): Rubbing test
The color strength of a spread portion when the color strength of a rubbed portion is taken as 100%.
(*2): Color strength The color strength when the color strength of a color extended portion of the enamel obtained by using the sample of Example 1 is taken as 100%.

TEST EXAMPLE 2

The infrared absorption spectra (2400 to 3200 cm$^{-1}$) of the dimethylaminomethyl copper phthalocyanines obtained in Examples 1 to 3 and Comparative Examples 1, 2 and 4 were measured. The absorption at 3060 cm$^{-1}$ based on the aromatic ring of the copper phthalocyanine was taken as a standard, and the relative intensities of absorptions at 2773 cm$^{-1}$ and 2688 cm$^{-1}$ were calculated.

As the dimethylation of the amino group of the aminomethyl copper phthalocyanine proceeds, the intensities of the absorptions at 2773 cm$^{-1}$ and 2688 cm$^{-1}$ increase markedly. Hence, the higher relative intensities show that the dimethylation proceeds more and the amount of by-products such as monomethylaminomethyl copper phthalocyanine is smaller. The results are shown in Table 2. The infrared absorption spectra of the dimethylaminomethyl copper phthalocyanines obtained in Example 1 and Comparative Example 1 are shown in FIGS. 1 and 2, respectively.

TABLE 2

| Ex. or CEx. | Relative intensity to the absorption at 3060 cm$^{-1}$ | |
| --- | --- | --- |
| | 2773 cm$^{-1}$ | 2688 cm$^{-1}$ |
| Ex. 1 | 1.88 | 2.10 |
| Ex. 2 | 1.86 | 2.03 |
| CEx. 1 | 1.11 | 1.17 |
| CEx. 2 | 1.31 | 1.46 |
| Ex. 3 | 0.75 | 0.70 |
| CEx. 4 | 0.48 | 0.42 |

As shown in Table 2, the samples of Examples 1, 2 and 3 have about 1.4 to 1.8 times as high relative absorption intensities at 2773 cm$^{-1}$ and 2688 cm$^{-1}$ to absorptions at 3060 cm$^{-1}$ as the samples of Comparative Examples 1, 2 and 4. Accordingly, the samples of Examples 1, 2 and 3 have much higher degrees of dimethylation than the samples of Comparative Examples 1, 2 and 4 and contain much smaller amounts of by-product aminomethyl copper phthalocyanine and monomethylaminomethyl copper phthalocyanine.

In Examples 4 and 5, the same tendency as in Example 1 was observed. In Comparative Example 3, the same tendency as in Comparative Example 1 was noted.

What is claimed is:

1. A process for producing dimethylaminomethyl copper phthalocyanine and/or its derivative represented by the general formula

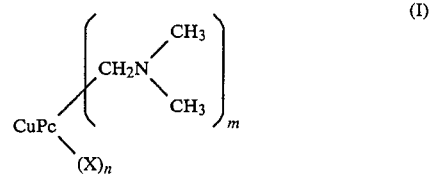

wherein CuPc represents a copper phthalocyanine residue, X represents a hydrogen atom, a halogen atom, the group —SO$_3$H or the group —CH$_2$OH, and m and n independently represent an integer of 1 to 4,
and containing only slight amounts of by-products, which comprises reacting aminomethyl copper phthalocyanine and/or its derivative represented by the general formula

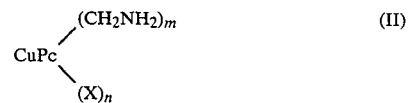

wherein CuPc, X, m and n are as defined above,
with formic acid and a formaldehyde-generating substance at a temperature of 130° to 150° C. under a pressure of 3 to 10 kg/cm$^2$ (gauge).

2. The process of claim 1 wherein the aminomethyl copper phthalocyanine and/or its derivative represented by general formula (I) is selected from mono(aminomethyl) copper phthalocyanine, di(aminomethyl) copper phthalocyanine, tri(aminomethyl) copper phthalocyanine and tetra(aminomethyl) copper phthalocyanine.

3. The process of claim 1 or 2 wherein the amount of formic acid used is 6 to 8 moles per mole of the amino group of the aminomethyl copper phthalocyanine and/or its derivative represented by general formula (II).

4. The process of claim 1 or 2 wherein the formaldehyde-generating substance is at least one compound selected from the group consisting of formaldehyde, formalin and paraformaldehyde.

5. The process of claim 1 or 2 wherein the amount of the formaldehyde-generating substance used is 2 to 3 moles as formaldehyde per mole of the amino group of the aminomethyl copper phthalocyanine and/or its derivative represented by general formula (II).

* * * * *